May 13, 1958 J. F. HUGHES 2,834,376
APPARATUS FOR CONTROLLING LUBRICANT FLOW
TO A PLURALITY OF LUBRICATED POINTS
Filed April 25, 1956
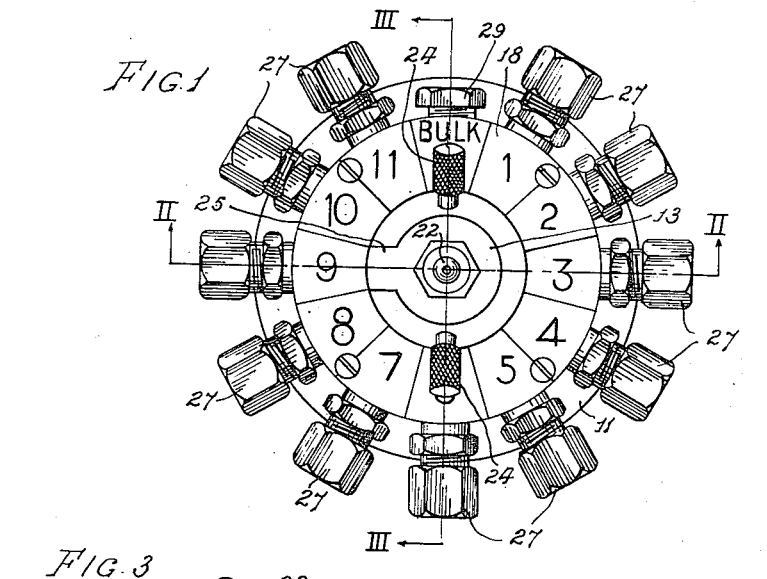
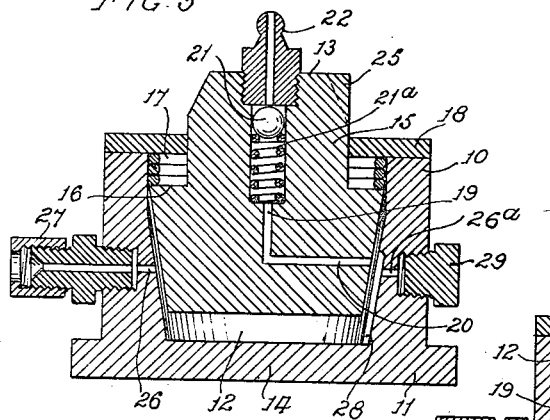
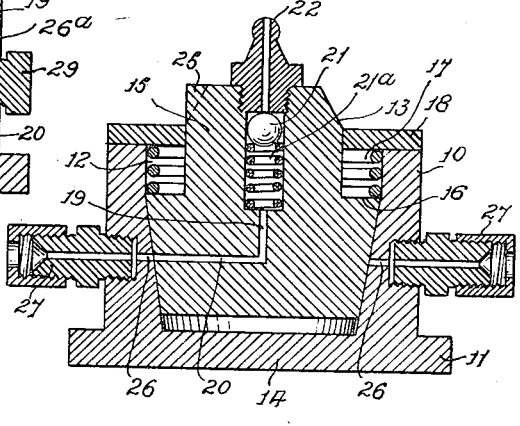
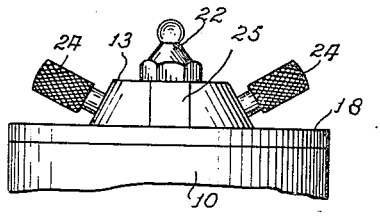
INVENTOR
John Farrar Hughes.
By Ross & Ross, Attys.

United States Patent Office 2,834,376
Patented May 13, 1958

2,834,376

APPARATUS FOR CONTROLLING LUBRICANT FLOW TO A PLURALITY OF LUBRICATED POINTS

John Farrar Hughes, Droylsden, Manchester, England

Application April 25, 1956, Serial No. 580,619

Claims priority, application Great Britain May 10, 1955

3 Claims. (Cl. 137—625.11)

This invention has reference to apparatus for controlling lubricant flow to a plurality of lubricating points and is more particularly, though not essentially, applicable to the lubrication of vehicles, such as motor vehicles, where many points, widely separated and often in places difficult to reach, have to be kept lubricated.

The invention has for its object the provision of means whereby the lubrication required at a plurality of lubricating points can be effected and controlled from one or more central positions which is, or are, easily accessible.

In carrying out the invention, there is provided, for a lubricating system, a control valve having a single inlet for the lubricant, and a plurality of outlets, one to each lubrication point in the system, the valve having a rotary member which can be turned to put any outlet in direct communication with the single inlet, or all of the outlets in communication with the single inlet. The lubricant may be supplied to the valve by manual or mechanical pressure.

The invention will be described further, by way of example, with reference to the accompanying drawings in which:

Fig. 1 is a plan view of a control valve constructed in accordance with the invention;

Fig. 2 is a cross-sectional side elevational view of the valve shown in Fig. 1, corresponding to the line II—II of Fig. 1;

Fig. 3 is a cross-sectional elevational view corresponding to the line III—III of Fig. 1 but showing the valve plug rotated to the position wherein all the outlets are in communication with the inlet; and Fig. 4 is a fragmentary side elevational view of the upper part of the valve.

The valve, made in accordance with this invention, comprises a body 10 which is flanged at 11 to permit it to be secured in a convenient position on the vehicle, assuming the system is to be used on a vehicle, which is a typical example of its use. The body has a cylindrical opening 12, the lower part of which is tapered and in which a valve plug 13 is accommodated, the plug 13 being capable of rotation and also of a limited in and out movement. The plug 13 does not reach to the bottom of the opening 12 so that a space is left between the inside end of the plug and the base (indicated by numeral 14) of the valve. The top or outside end of the plug 13 has a reduced diameter part 15 which forms a shoulder 16, and on this shoulder 16 and around the part 15 of the plug of reduced diameter a helical spring 17 is disposed, which spring 17 abuts against a cover plate 18 secured on the body 10 and so tends to force the plug 13 inwards.

The plug has a central opening 19 and a radial opening 20 connected thereto, so that lubricant pumped down the central opening 19 will emerge from the radial opening 20. In the central opening is a ball valve 21 and a spring 21a which allows lubricant to be pumped in to the valve but will not allow it to travel in the opposite direction. Above or beyond this ball valve 21 is a nozzle or union 22 to which a grease-gun (not shown) may be attached, or it may be in communication with a source of supply pumped in by mechanical pressure. The plug 13 has a handle 24 by which it can be turned, and also a pointer 25 to show in which direction it is turned, such a pointer being aligned with the radial opening 20 already referred to.

The body 10 of the control valve has a plurality of radial openings 26, all but one (26a in Fig. 3) of which is connected respectively to a union 27 by means of which the valve can be connected to a plurality of lubrication points (not shown) and the radial openings 26 in the body 10 are aligned with the radial openings 20 in the plug 13 when the latter is at its normal maximum inward position as shown in Fig. 2, so that when the plug 13 is turned to any one of these openings 26 there is a direct communication from the plug nozzle or union 22 to the respective lubrication points. The unions connected to the various lubrication points may be indicated by names, letters or figures or other indicia, (figures being shown in the drawings) but if these are used a chart may be necessary to show the user which part will be lubricated with the pointer 25 in any particular position.

The opening 26a in the body which is not connected to a lubrication point is connected, or leads by means of a groove 28 to the space between the end of the plug 13 and the base 14 of the body, so that when the pointer 25 is turned in direction marked "Bulk" in Fig. 1 the lubricant, instead of going to a lubrication point, will fill the aforementioned space and as the pressure increases therein the plug 13 will be lifted so that the lubricant will pass out to all the openings 26 to the lubrication points, as is shown in Fig. 3.

It will be appreciated that some points of lubrication will need more pressure than others in order to get the lubricant through and also that it is possible that a block may occur in any one of the connections leading from the valve to a lubrication point. By turning the plug 13 to any point, a test may be made to ensure that the lubricant is passing freely.

If it be desired to use the device with automatic lubrication, a plug 29 closing the outer end of the passage 26a may be removed and a connection made to a constant or intermittent pressure system, so that the space between the plug end and the body will be kept filled and will constantly supply lubricant to all the lubrication points. Any lubricant which may enter the openings or passages 19, 20, in the plug 13 will not be able to escape through the plug inlet because of the ball valve 20 therein.

It will be appreciated that by using this invention the lubrication of a number of lubrication points can be effected very conveniently, and, owing to the fact that all the lubrication points can be connected by tubes to the valve controlling them, the possibility of dirt and grit getting into the lubrication points, as it can do with many forms of lubrication, is very greatly reduced.

The invention is not limited to the precise details of the foregoing example, and variations may be made thereto, if desired. Thus, instead of providing a helical spring 17, a disc-like metal spring could be employed to urge the plug 13 to its lowermost position.

If it is desired to provide an arrangement for lubricating a large number of points such as to make it impossible to arrange the corresponding unions in a single row around the body 10, the passages 26 and unions 27 could be at different levels, i. e. alternatively one up and one down, but in such case it is necessary to provide a groove, recess or the like in the outer curved surface of the plug 13 in correspondence with radial passage 20 so as to ensure that the latter will register with all the passages 26.

I claim:

1. A valve for controlling fluid to a plurality of points comprising in combination, a body provided with a bore disposed on a vertical axis having a bottom and being closed at its upper end, said body provided with circumferentially spaced separate outlets extending outwardly from said bore, a plug in said bore having inlet means in the upper end thereof for connection to a fluid supply and provided with a central opening therebelow and outlet means extending from the central opening radially outwardly through said plug, check valve means in the central opening below said inlet means arranged to prevent flow outwardly of fluid through said inlet means, said plug being reciprocable in said bore between upper and lower positions and the sides of said bore and plug being complemental and converging downwardly and arranged for engagement to limit the lower position of said plug and provide a space between the lower end thereof and bottom of said bore, a spring urging said complemental sides into engagement with each other, said plug being rotatable in said bore and the outlet means thereof being arranged for communication with a selected one of the outlets of said body in lower position of said plug, said body provided with communicating means between at least one of the outlets thereof and the space between said lower end of the plug and bottom of said bore whereby inlet pressure is transmitted into the bottom of said bore for acting on the bottom of said plug to raise it against the force of said spring and permit all of said outlets of said body to be fed simultaneously.

2. A valve for controlling fluid as set forth in claim 1 wherein said communicating means includes a groove provided in a side of the bore of said body extending downwardly from said one outlet and terminating in the space between the lower end of said plug and bottom of said bore.

3. A valve for controlling fluid to a plurality of points comprising, a body having a vertical closed bore and a plug rotatable and reciprocable therein, said body having circumferentially spaced outlets extending outwardly from said bore, said plug having inlet means in the upper end thereof and an opening therebelow with outlet means extending radially outwardly from said opening through a side of said plug, check valve means in said opening to prevent fluid flow outwardly through said inlet means, the sides of said bore and plug converging downwardly and arranged to limit the lower position of said plug in the bore and in lower position of said plug provide a space between the lower end of said plug and bottom of said bore, a spring urging the sides of said bore and plug into engagement with each other, said outlet means of said plug arranged for communication with an outlet of said body on rotation of said plug in its lower position, said body provided in the bore thereof with a groove extending downwardly from one of said outlets to the space between the lower end of said plug and bottom of said bore whereby inlet pressure is transmitted into the bottom of said bore for acting on the bottom of said plug to raise it against the force of said spring and permit all of said outlets of said body to be fed simultaneously.

References Cited in the file of this patent

UNITED STATES PATENTS

| 1,887,199 | Gillam | Nov. 8, 1932 |
| 2,626,015 | Erikson | Jan. 20, 1953 |
| 2,698,120 | Fairchild | Dec. 28, 1954 |

FOREIGN PATENTS

| 159,922 | Great Britain | Mar. 7, 1921 |